Dec. 26, 1950        E. A. JOHNSON        2,535,068
SUBMARINE DETECTING DEVICE
Filed Sept. 6, 1941        6 Sheets-Sheet 1
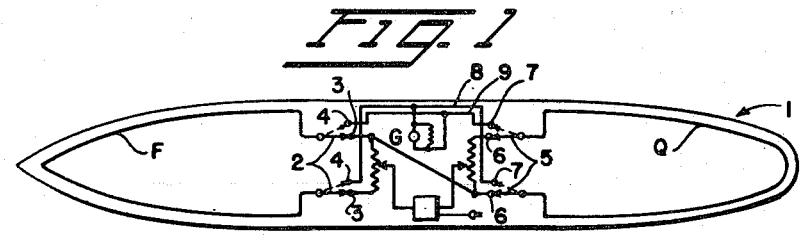
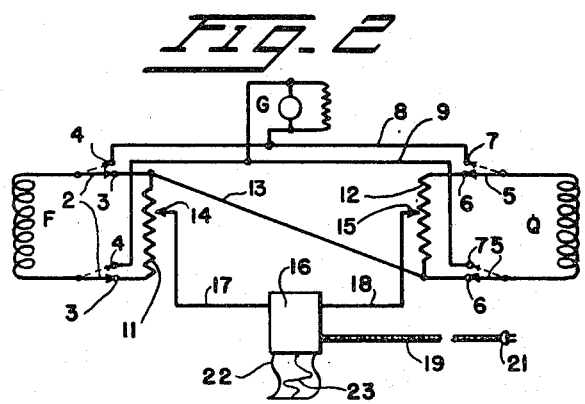
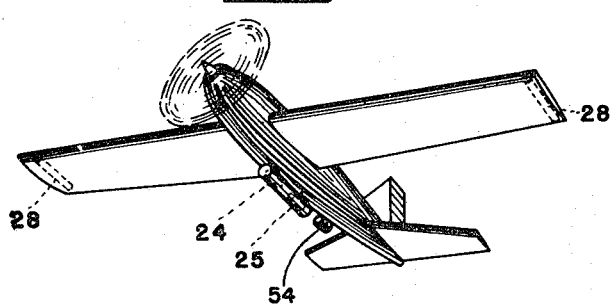
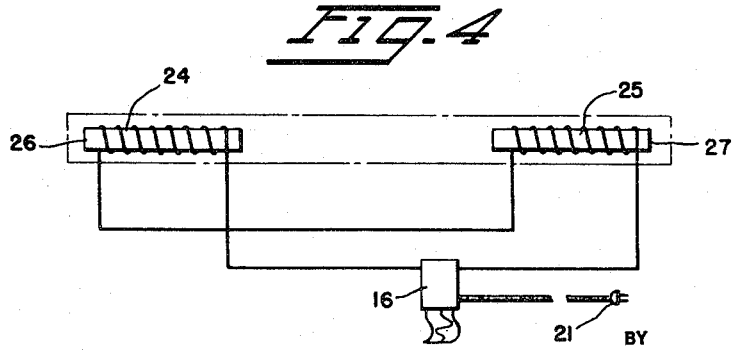
INVENTOR
E.A. JOHNSON
ATTORNEY Dec. 26, 1950  E. A. JOHNSON  2,535,068
SUBMARINE DETECTING DEVICE
Filed Sept. 6, 1941  6 Sheets-Sheet 2
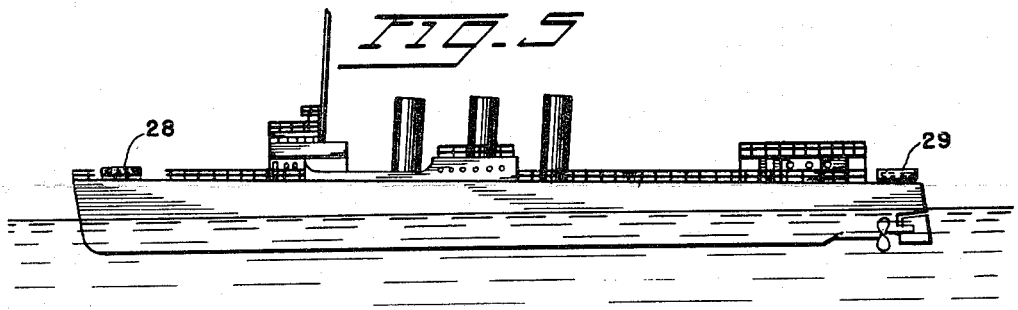
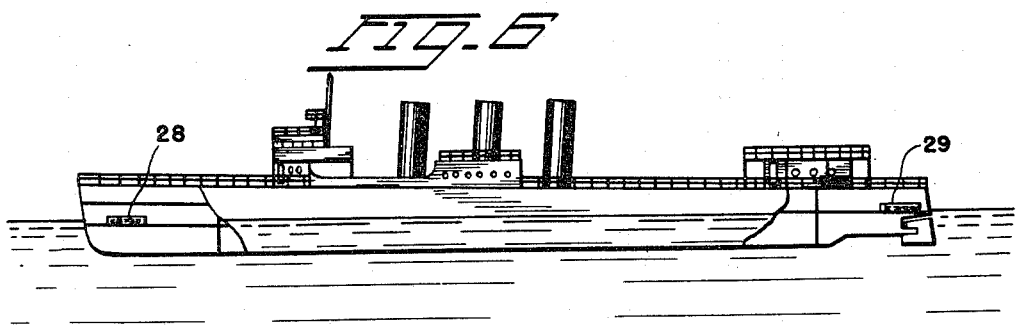
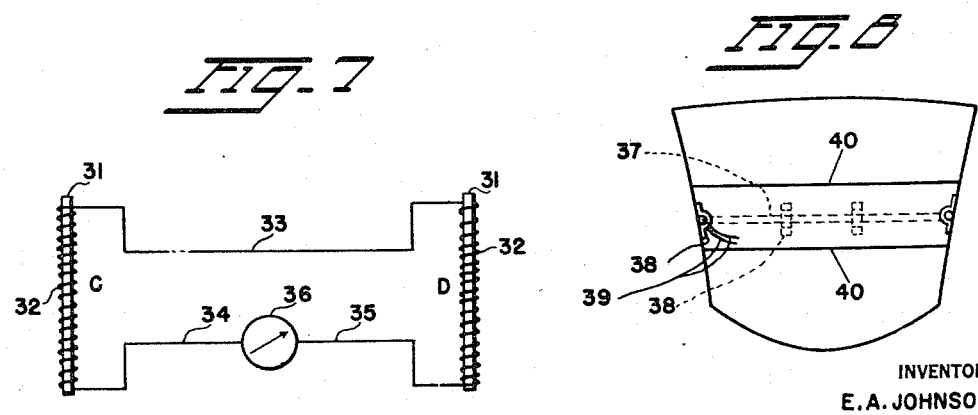
INVENTOR
E. A. JOHNSON
BY
ATTORNEY

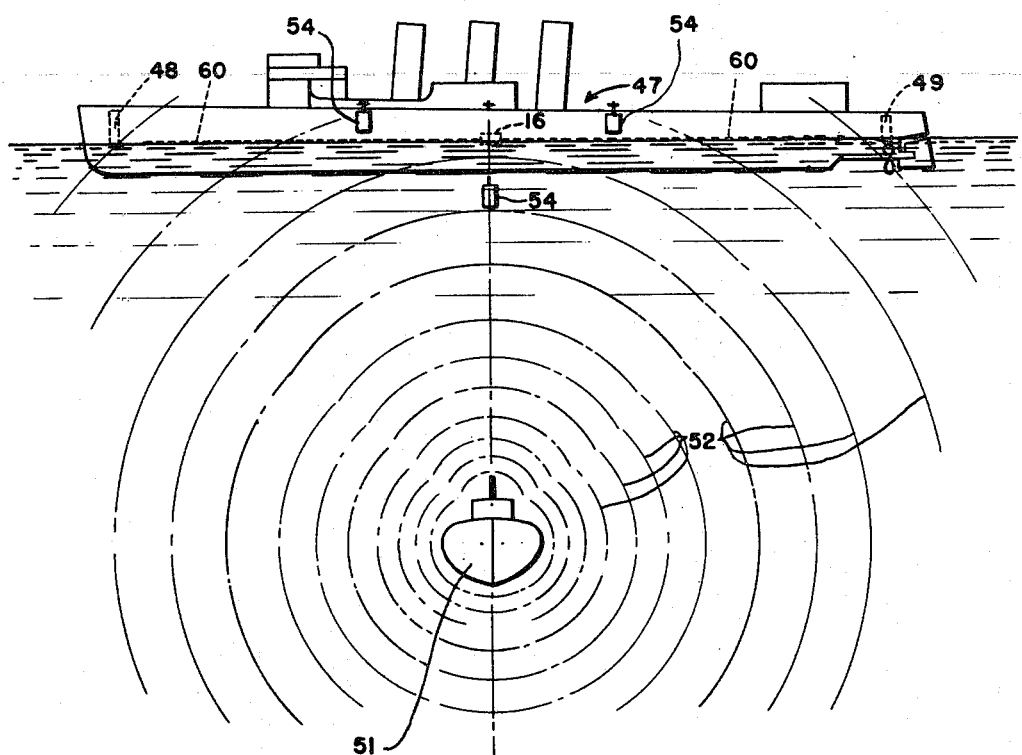
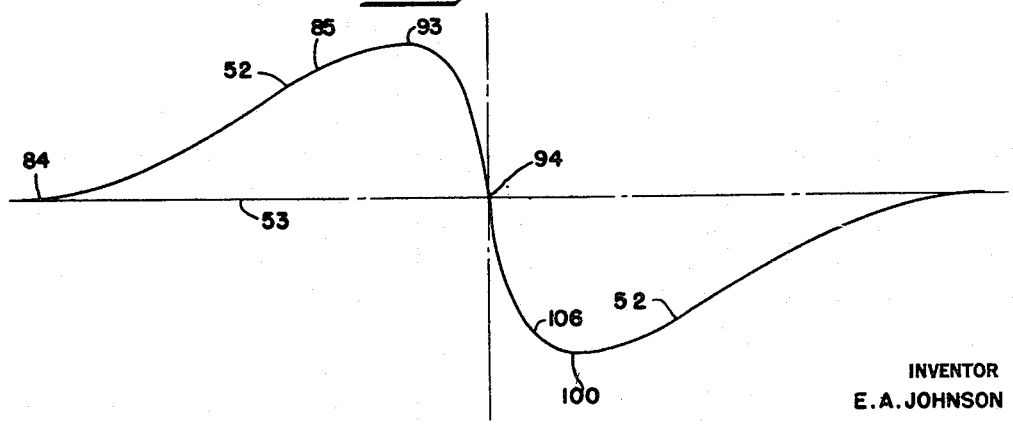

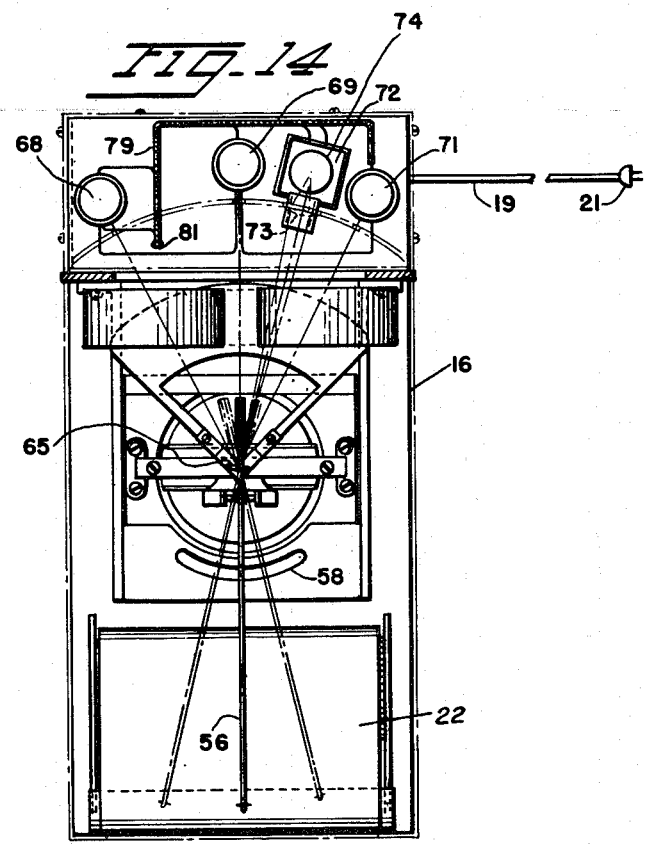
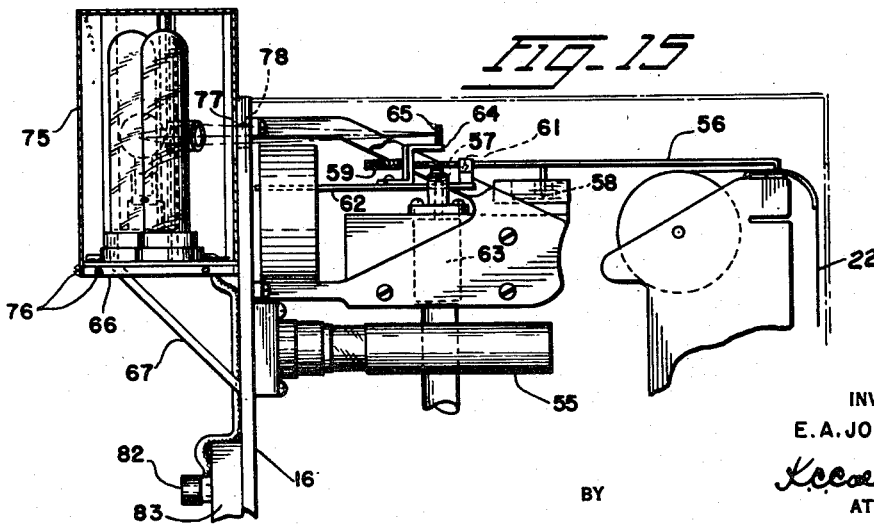

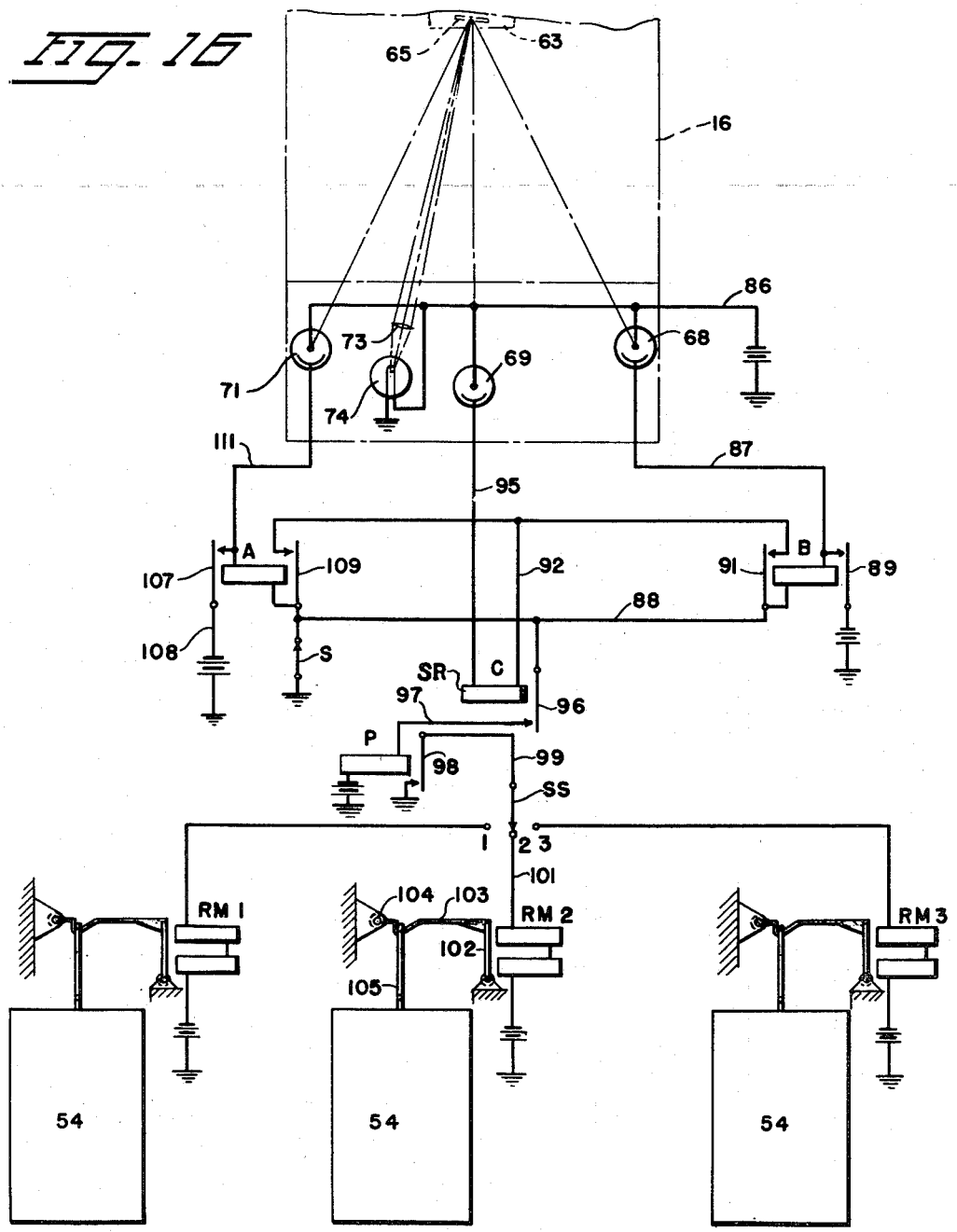

Patented Dec. 26, 1950

2,535,068

UNITED STATES PATENT OFFICE 2,535,068

SUBMARINE DETECTING DEVICE

Ellis A. Johnson, Chevy Chase, Md.

Application September 6, 1941, Serial No. 409,774

20 Claims. (Cl. 89—1.5)

(Granted under the act of March 3, 1883, as amended April 30, 1928; 370 O. G. 757)

This invention relates to means for detecting the presence of a submarine submerged beneath the surface of a body of water in which the gradient of the magnetic field of the submarine is employed to control the detecting mechanism. More specifically the invention provides an arrangement in which the gradient effect of the magnetic field of a submarine is detected by mechanism arranged on an attacking vessel in which the effects of pitch and roll of the vessel are greatly reduced and in which means are provided for automatically releasing a depth charge or explosive bomb as the vessel passes over the detected submarine.

In devices heretofore proposed for detecting submarines the detecting mechanism employed is usually of a type in which the presence of a submarine is made manifest through the operation of certain sensing mechanism adapted to respond to sound waves or impulses or by the operation of supersonic devices carried by the attacking vessel. Such devices have proved to be not entirely reliable under certain conditions of service due to the effects of temperature gradients on the devices and the complication in the operation of the devices when the attacking vessel is moving through the water at a relatively high rate of speed. Further difficulties have been experienced with these devices for the additional reason that both the submarine and its wake produce reflections of sufficient magnitude to be detected by the devices and, in certain cases, the presence of a large fish within the vicinity of the device has produced reflections similar to those caused by a submarine.

In the system of the present invention the gradient effect of the magnetic field set up by a submarine is employed to control the operation of an electro-responsive device carried by the attacking vessel. Briefly stated, the invention contemplates the provision of new and improved means for detecting magnetic disturbances caused by relative movement between the detecting mechanism and the submarine in which a magnetic gradient is employed to detect the presence of a submarine and cause a depth charge or explosive bomb to be automatically released at a predetermined position whereby the greatest destructive action of the depth charge on the submarine may be effected.

It is the present general practice to install large coils of wire on the forward and aft portions of a vessel passing through enemy waters and to provide means for passing an electric current through the coils for the purpose of neutralizing the magnetic field set up by the vessel as a protection against submarine mines. Such a procedure is referred to herein as degaussing and the coils employed for this purpose as degaussing coils, the forward coil being referred to as the F coil and the aft coil as the Q coil. These coils may be employed with the system of the present invention as gradiometer or search coils or, if desired, additional coils may be provided.

The invention is also adapted for use with an aircraft in flight whereby the presence of a submarine or other steel vessel may be detected by two coils of wire disposed in spaced relation with each other along the fuselage of the aircraft or, in the case of an airplane, preferably near the opposite ends of the wing, the detecting mechanism preferably including means for automatically releasing a depth charge or explosive bomb directly above the detected vessel.

One of the objects of the present invention resides in the provision of new and improved means for detecting the presence of a submarine and indicating when the attacking vessel passes over the submarine.

Another of the objects is the provision of means carried by an attacking vessel for detecting the presence of a submarine and automatically releasing an explosive charge in proximate relation to the submarine.

Another of the objects resides in the provision of new and improved means for employing the degaussing coils of a vessel as a submarine detecting device.

Another of the objects is the provision of means settable at will for balancing the inductive effect of the degaussing coils of a vessel thereby to cause a signal to be generated as the vessel passes over a submarine.

Another object is the provision of means for recording an indication of the presence of a submarine within the vicinity of an attacking vessel.

Another of the objects is the provision of a submarine detecting device carried by a vessel in which the effects of pitch and roll of the vessel are reduced.

Another object is the provision of new and improved means carried by a vessel for detecting the presence of a submarine while the vessel is moving at a relatively high rate of speed.

Still another of the objects resides in the provision of means for automatically releasing a depth charge as the attacking vessel passes over a submarine in which the depth charge is released selectively from different portions of the vessel in accordance with the rate of travel of the vessel through the water.

A further object is the provision of new and improved means for detecting the presence of a submarine from an aircraft in flight and automatically releasing a depth charge as the aircraft passes over the submarine.

Still further objects, advantages, and improvements will be apparent from the following description of the invention taken in connection with the accompanying drawings, of which:

Fig. 1 illustrates diagrammatically an arrangement in which the degaussing coils of a vessel are employed to control a submarine detecting and depth charge releasing mechanism;

Fig. 2 illustrates diagramatically the electrical circuit arrangement of Fig. 1;

Fig. 3 is a view in perspective of an aircraft in flight employing the device of the present invention;

Fig. 4 illustrates diagrammatically an alternative electrical circuit arrangement suitable for use with the aircraft of Fig. 3;

Fig. 5 is a view in elevation of a vessel employing the submarine detecting device of the present invention;

Fig. 6 is a view in elevation, partly broken away, showing an alternative arrangement in which the effects of pitch and roll of the vessel are reduced;

Fig. 7 illustrates diagrammatically an alternative form of detecting mechanism suitable for use with the present invention;

Figure 9:
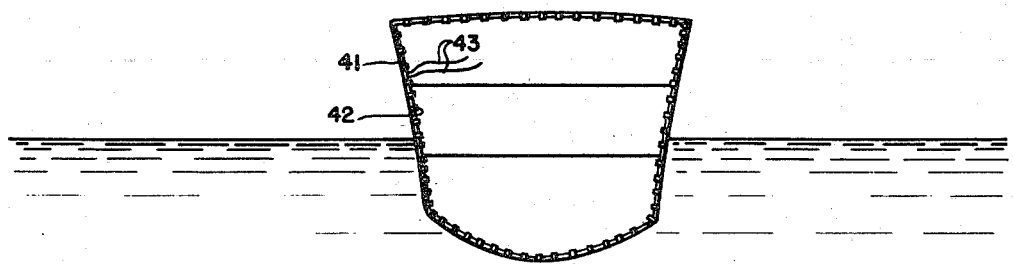
Figure 10:
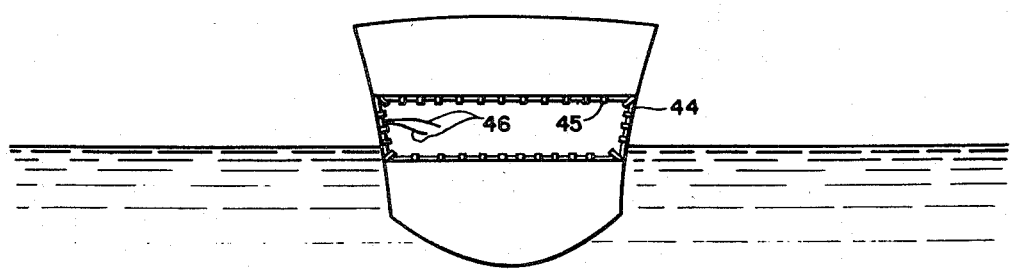
Figure 11:
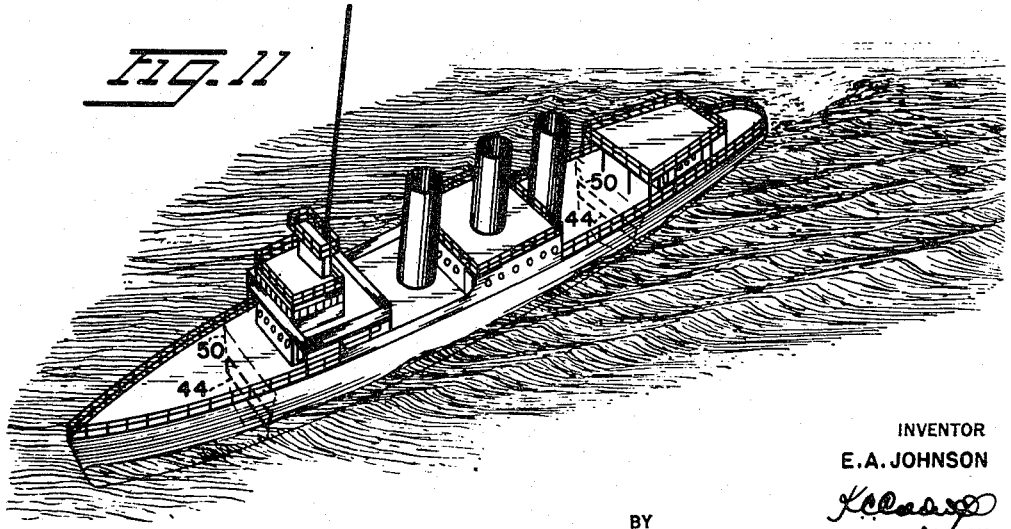

Figs. 8, 9, and 10 illustrate schematically alternative forms and arrangements of detecting coils suitable for use with the invention and disposed transversely of a vessel;

Fig. 11 is a view in perspective of a vessel employing the detecting coils of Fig. 10;

Fig. 12 is a view in elevation of a vessel in which is illustrated a submarine detected by the system of the present invention;

Fig. 13 illustrates graphically the signal recorded by the recorder of the system of Fig. 12 as the vessel passes over the submarine;

Fig. 14 is a plan view, partly in section, of the recording control mechanism of Fig. 12;

Fig. 15 is a view in elevation, partly in section and partly broken away, of the device of Fig. 14; and Fig. 16 illustrates diagrammatically an electrical circuit suitable for use with the present invention for controlling the depth charge releasing mechanism from a vessel or aircraft.

Referring now to the drawings on which like numerals of reference are employed to designate like parts throughout the several views, and more particularly to Fig. 1 thereof, there is shown thereon a steel vessel such, for example, as a destroyer or transport indicated generally by the numeral 1 and provided with a degaussing coil F within the forward part of the vessel and a degaussing coil Q within the aft portion of the vessel. The coil F is connected at the ends thereof preferably to a switch 2 provided with electrical contacts 3 and 4. In a similar manner the coil Q is connected to the switch 5 provided with electrical contacts 6 and 7. The contacts 4 of switch 2 are in electrical circuit with the contacts 7 of switch 5 by means of the conductors 8 and 9 extending therebetween. The conductors 8 and 9 are also connected to a source of electrical energy such, for example, as the generator G illustrated whereby, when the switches 2 and 5 are in the position indicated in broken outline, the coils F and Q are in an energized condition and are employed as degaussing coils.

When the degaussing coils are to be employed for submarine detection, switches 2 and 5 are moved to the position indicated in solid outline thereby connecting the resistance elements 11 and 12 across the coils F and Q respectively and disconnecting the coils F and Q from conductors 8 and 9. The resistance units 11 and 12 are connected together by the conductor 13 in the manner illustrated, Fig. 2, and are provided with settable contact elements 14 and 15 in electrical circuit with an indicating device such, for example, as the recording fluxmeter or voltage integrating device 16, conductors 17 and 18 being provided for completing the circuit connections between the indicating device and the settable contact elements 14 and 15. The recording fluxmeter is provided with an electrical cord or cable 19 comprising two electrical conductors in circuit with the terminals of plug 21 adapted to be inserted within a socket connected to a source of electrical power.

The settable contacts 14 and 15 are adjusted to positions such that the signal generated by the coils F and Q, as the coils move through the earth's magnetic field, are equal in character and a negligible amount of current flows through the conductors 13, 17, and 18 whereby the recorder 16 produces a substantially straight trace upon the moving chart 22 whereas, when the vessel passes over a submarine, a trace such as illustrated at 23 is produced on the chart 22, as will more clearly appear as the description proceeds.

Referring now to Fig. 3, there is shown thereon an airplane in flight having a pair of coils 24 and 25 disposed beneath the fuselage in axial alignment with each other, each of the coils 24 and 25 preferably encircling a magnetic rod illustrated at 26 and 27, Fig. 4, of permeable material such, for example, as a material known in the trade as permalloy, having the composition of substantially 21½ per cent iron and 78½ per cent nickel thereby to increase the number of flux linkages of the coils. The coils 24 and 25 are adapted to produce identical signals under identical conditions of changing magnetic field within which the coils are disposed and, for this reason, signal compensating devices such as illustrated at 11 and 12 of Fig. 2 are not required to balance the signal output of these coils against each other. As illustrated on Fig. 4 the coils 24 and 25 are connected in series with their windings opposing each other, the circuit being continued through an indicating device 16 suitable for the purpose such, for example, as a microammeter or the flux recording device illustrated. In the event that the flux recording device is employed as an indicating mechanism, it will of course be understood that the plug 21 connected thereto is in circuit connection with a source of electrical power and, if desired, the system of Fig. 16 may be employed to release a depth charge automatically as the airplane passes over the detected submarine.

As illustrated on Fig. 3 the induction coils 24 and 25 may, if desired, be placed within the wing of the airplane, near the extreme ends thereof such as indicated generally at 28. The coils 24 and 25, it will be understood, generate variable voltages therein in accordance with the variations of the flux linkage of the coils with the magnetic field within which the coils are disposed, the gradient field thus detected being employed for operating the signal device 16. The sensitivity of the detecting device, it will be understood, will be increased by increasing the distance separating the coils.

On Fig 5 is illustrated a vessel having a search coil 28 on the forward deck and a search coil 29 on the aft deck of the vessel, each of the coils 28 and 29 being connected together in the manner of Fig. 2 or Fig. 4, as the case may be, and adapted to control an indicating device for registering the location of a submarine and provided preferably with means for automatically releasing a depth charge or explosive bomb as the vessel passes over or within very close proximity to the detected submarine.

On Fig. 6 is shown a vessel in which the search coils 28 and 29 are disposed within the vessel at opposite ends thereof, preferably near the water line or metacenter of the vessel. This disposition of the search coils provides an arrangement in which the roll and pitch of the vessel produces less disturbing effects within the search coils than the arrangement of Fig. 5 and for this reason a higher degree of sensitivity of the detecting mechanism may be employed.

On Fig. 7 is shown an alternative arrangement comprising two search coils having a rod or shaft of iron or permalloy 31 disposed within a winding 32 and connected together as by the conductor 33 at one end of each of the windings and at the other end of the windings by the conductors 34 and 35, the circuit including a recording or registering device 36 adapted to be actuated by currents flowing therethrough in response to changes in the magnetic fields threading the coils 32. For purposes of description the coils are designated by the letters C and D and connected in series opposition such that the electromotive force generated by the coil C, for example, opposes and neutralizes the electromotive force generated by the coil D when both coils are subjected simultaneously to the same conditions of changing magnetic field. The coil C may be mounted, for example, in a vertical position within the bow of the vessel and the coil D mounted within the stern of the vessel with the axis of the coil D parallel to the axis of the coil C. An alternative arrangement would be provided by mounting the coils C and D in a horizontal position in the fore and aft portions, respectively, of the vessel with the axis of the coils in alignment with each other.

A third arrangement satisfactory for the purpose would be to arrange the coils C and D within the bow and stern of the vessel respectively, with their axes horizontal and athwart the ship such that the axis of the coil C is parallel to the axis of coil D. As heretofore stated, the effect of pitch and roll is reduced by arranging the coils near the water line, and preferably near the metacenter of the vessel. The registering device 36 may comprise the recording fluxmeter 16 hereinbefore referred to or an indicating instrument such, for example, as a microammeter suitable for the purpose. In the event that the instrument 16 is employed, the depth charge releasing mechanism of Fig. 16 may be used to control the automatic release of the depth charge, whereas if a microammeter is employed as the indicating device 36, the depth charge may be released manually by an attendant in response to the signal received from the indicating device.

Fig. 8 shows an arrangement in which the fore and aft detecting coils 37 are arranged in a horizontal position between platforms 40 of the vessel within a space such, for example as that enclosed by two adjacent bulkheads and secured to the vessel as by the cable clamps 38. Each coil is provided with a pair of conductors 39 adapted to establish an external circuit connection to the coil.

On Fig. 9 an arrangement is shown in which the search coils 41 are disposed athwart the vessel and secured thereto as by the clamps 42, the coil being provided with conductors 43 for establishing an external circuit connection with the control mechanism.

On Fig. 10 the search coils 44 are disposed athwart the ship between adjacent platforms and secured preferably to a bulkhead as by the clamps 45, the conductors 46 being provided for external control connection. In each of the arrangements shown on Figs. 8, 9, and 10, it will be understood that two coils are provided whereby the gradient effect of the changing magnetic field may be employed to control a recording and depth charge releasing mechanism. Each of the coils is located preferably near an end of the vessel whereby the sensitivity of the system in response to gradient effects may be of a considerable order of magnitude.

In Fig. 11 is illustrated a vessel in which the arrangement of Fig. 10 is employed, the coils 44 being secured to the bulkheads 50 located in the forward and aft portions of the vessel, respectively.

In Fig. 12 is shown a vessel indicated generally by the numeral 47 having a pair of search coils 48 and 49 disposed with axes vertical near the ends of the vessel and adapted to respond to changes of the magnetic field within the coils set up by a submarine 51 over which the vessel is passing. A suitable cable such as that illustrated at 60 is employed to establish an electrical circuit connection between the coils 48 and 49 and the recording and release control mechanism 16. It is well known that a steel vessel such, for example, as a submarine acquires a certain degree of magnetism imparted thereto in the process of fabrication of the vessel and also during the travel of the vessel through the earth's magnetic field. This magnetic field about the submarine is indicated generally by the dashed lines 52, the intensity of the magnetic field being greater within close proximity to the submarine than at relatively greater distances therefrom.

During the approach of the vessel toward the hidden submarine, the coil 48 acquires more flux linkages than the more distant coil 49. As the coil 48 passes through the vertical plane of the submarine the number of flux linkages through it begin to decrease. When the vessel has progressed sufficiently such that the coils 48 and 49 are equidistant from the vertical plane of the submarine, the number of linkages in each of the coils 48 and 49 is the same. As the ship passes beyond the field of the submarine, coil 49 changes its linkages in the same manner as did coil 48 during the entrance of the vessel within the field of the submarine.

It will be noted that the coils 48 and 49 are in such electrical connection that the recording fluxmeter indicates the difference between the instant flux linkages of each of the two coils. Thus when, in passing through the field of the submarine, the coils had each received an equal total number of linkages, the moving element of the fluxmeter will be moved to the null or zero position illustrated on the curve 52, Fig. 13, at the point 94 thereof. The points 93 and 100 of the curve 52 illustrate the instants at which a maximum difference in linkages of the coils 48 and 49 have occurred. From the foregoing it will be noted that the recording fluxmeter, as employed in the system of the present invention, takes and holds settings in accordance with the difference between the number of flux linkages occurring in the two coils 48 and 49.

The trace of the signal received from the coils 48 and 49 is shown on Fig. 13 by the curve 52 thereof, in which the dashed line 53 is employed to designate the null position of the actuating element of the recording fluxmeter 16 when there is no submarine or other ponderous mass of magnetic material within the vicinity of the vessel 47. For purposes of illustration, the vessel of Fig. 12 is projected across the curve 52 to indicate more clearly the position of the vessel relative to the submarine when the signal represented by the curve 52 passes through the null point opposite the hidden submarine. When this occurs, a depth charge 54 is released selectively at a predetermined point with respect to the vessel 47, whereby the maximum destructive effect of the depth charge upon the submarine is accomplished.

The manner in which the gradient signal received from the search coils is employed to record the signal and control the release of a depth charge and the mechanism provided therefor will now be described:

On Figs. 14 and 15 are shown in plan and elevation respectively a recording fluxmeter 16 suitable for use with the system of the present invention, such for example as, the photoelectric recorder No. 726337, shown in Catalogue 32C144 of the General Electric Company and provided with terminals such as shown at 82 for establishing an electrical connection between the search coils and the instrument. The recording instrument is provided with means such as an electrical cord 19 and plug 21 for establishing a circuit connection with a source of electrical power. The instrument is provided with means including a pair of photoelectric tubes 55 controlled by an optical system for causing an inking pen 56 to be set to different positions in accordance with variations in the current received from the search coils, the inking pen remaining in any set position until moved therefrom by a flow of current in the actuating coil 63. Movement of the pen 56 about the pivot support 57 causes ink from the well 58 to be drawn into the pen 56 and transferred to the moving chart 22, thereby to record in graphic form the movements of the pen. A counterweight 59 is provided preferably on the pen member 56 whereby the weight of the pen and the friction of the pen against the moving chart is maintained at a minimum. The pen is pivoted at 61 for rotation in a vertical plane, the pivot 61 being secured to a member 62 rotatable about a horizontal plane and controlled by the coil 63 in accordance with the action of the photoelectric tubes 55.

Secured to the member 62 as by the support 64 is a mirror 65 having the plane of reflection thereof coincident with the vertical axis of rotation of the pen member 56.

Attached to the rear of the instrument in any suitable manner is the shelf member 66, held in braced position thereto as by the support 67. Mounted upon the shelf are the photoelectric tubes 68, 69, and 71, arranged arcuately with respect to the mirror 65. A projector 72 comprising a lens 73 is also mounted on the shelf whereby the rays from an electric bulb 74 within the projector are focused upon the mirror 65 and directed against the photoelectric cell 69 with the pen in the null position. As the pen is moved by the actuating coil 63 to either of the positions indicated in dashed lines on Fig. 14, the rays of light from the projector are reflected by the mirror 65 upon the photoelectric tube 68 or 71, as the case may be, thereby causing the photoelectric tube to pass current from the source of electric power to certain control mechanism as will more clearly appear as the description proceeds. The photoelectric tube and projector are preferably enclosed within a casing 75, secured to the shelf as by the screws 76, thereby to exclude light from the photoelectric tubes, except as reflected by the mirror 65 through an aperture 77 provided within the casing 75 in substantial alignment with an aperture 78 within the rear of the instrument. The circuit connections to the photoelectric tubes and the projector are established by means of conductors within an electrical cable 79 passing preferably through an aperture 81 within the shelf 66 and terminating on a plurality of electrical connectors 82 mounted upon a connecting block 83 secured in any suitable manner to the rear of the instrument.

The manner in which the automatic release of a selected depth charge is accomplished in response to the signals received from the detecting mechanism as the attacking vessel passes over the magnetic center of a hidden submarine will best be understood by reference to Fig. 16, on which is shown in diagrammatic form the circuits and mechanism for controlling the release of a selected depth charge. The numeral 16 is employed to designate a recording device in electrical connection with a pair of coils of wire adapted to sense a changing magnetic gradient and control the recording element in accordance with the change in gradient of the field sensed. The recording device is provided, as heretofore stated, with a mirror 65 adapted to reflect rays of light from the electric bulb 74 to the photoelectric tubes 69, 71, and 68, in accordance with the instant position of the recorder element. The photoelectric tubes 71 and 68, are in electrical circuit with the windings of relays A and B respectively, and the photoelectric tube 69 is in circuit with relay C. The relays A, B, and C are adapted to be operated by a source of electrical energy when the associated photoelectric tubes are activated by light rays emanating from the electric bulb 74. A switch S is provided for releasing at will any of the relays A, B, and C. A power relay P is also provided in electrical circuit with the contacts of relay C such that the operation of relay C causes relay P to operate and apply a control potential to the selector switch SS whereby a release mechanism is caused to operate selectively in accordance with the setting of the selector switch SS and thus release a depth charge.

In the illustrative embodiment of the invention shown on Fig. 16, three depth charges 54 are shown supported by a latch mechanism comprising the release magnets RM1, RM2, and RM3 disposed preferably at different portions of the vessel such, for example, as the forward, center and aft portions and connected to the contacts of switch SS. The switch SS is employed to control the circuit connection to a predetermined release magnet whereby a depth charge may be released selectively from different portions of the ship in accordance with the setting of the switch SS. Thus, means are provided for automatically releasing a depth charge at different points along the attacking vessel in accordance with the rate of travel of the vessel through the water, whereby compensation is made for errors produced by the speed of the vessel at the moment of attack and the explosion of the depth charge substantially within the vertical plane of the submarine is effected. Whereas in the illustrative embodiment of the invention shown on Fig. 16, means are provided for selectively releasing three explosive charges, it will be understood that the number of explosive charges to be selectively released may be increased or decreased without departing from the spirit and scope of the invention, it being merely necessary to provide a selection switch SS having the appropriate number of selecting positions in operative connection with the depth charge releasing mechanism. The operation of the system of Fig. 16 will now be described:

Let it be assumed by way of example that the vessel 47, Fig. 12, is approaching the hidden submarine 51, switch S, Fig. 16, is in closed position and switch SS is set to position 2. Let it be further assumed that the movement of the recording element in response to the magnetic field of the submarine intercepted by the coils 48 and 49 as the ship passes the submarine follows the pattern of the magnetic signature of the submarine illustrated by curve 52 of Fig. 13.

As the coil 48 enters the threshold of sensitivity of the magnetic field set up by the submarine illustrated at 84, Fig. 13, the recording element and mirror 65 begin to rotate away from the null position, thereby causing the reflected light from the electric bulb 74 to be moved toward the photoelectric tube 68. Continued movement of the vessel toward the submarine causes the recording pen to be rotated about the pivot support 57 until the point 85 of the curve 52 is reached thereby causing the mirror 65 to be rotated through an angle sufficient to reflect the rays of light from the bulb 74 upon the photoelectric tube 68 and activate the photoelectric tube. A circuit is now closed from battery by way of conductor 86, photoelectric tube 68, conductor 87, winding of relay B, conductor 88, contacts of switch S and thence to ground thereby causing relay B to operate and lock by way of its make contact and armature 89 to battery. The operation of relay B at its armature 91 closes a circuit from ground at switch S, conductor 88, armature 91 and make contact of relay B, conductor 92, and thence to one end of the winding of relay C. As that portion of the ship corresponding to the point 93 of the curve 52 passes the vertical plane of the submarine, the current through the control element of the recording instrument is reversed, thereby causing the recording element thereof to rotate in a reversed direction toward the null position. As the light beam is moved away from the photoelectric tube 68, the photoelectric tube becomes nonconductive, as is well known in the art, and battery on conductor 86 is removed from the operate circuit of relay B but relay B does not release at this time, by virtue of the battery applied thereto at armature 89 and the make contact of relay B.

As the recording element moves into the null position indicated at 94 on Fig. 13, light from the electric bulb 74 is reflected by the mirror 65 into engagement with the photoelectric tube 69, thereby causing battery at conductor 86 to be applied by way of photoelectric tube 69 and conductor 95 to the winding of relay C, from whence the circuit is continued by way of conductor 92, make contact and armature 91 of relay B, conductor 88 and contact of switch S to ground, thereby causing slow releasing relay C to operate. The operation of relay C closes a circuit from ground at switch S, conductor 88, armature 96 and make contact of relay C, conductor 97, winding of relay P, and thence to battery, thereby causing relay P to operate. As armature 98 of relay P engages its make contact, ground is applied to conductor 99, switch SS and contact 2 thereof, conductor 101, winding of release magnet RM2, and thence to battery, thereby causing the release magnet RM2 to operate and move the latch 102 out of locking engagement with the pivoted support 103. The support 103 is caused to rotate about the pivot support 104, and thus releases the depth charge 54 suspended therefrom as by the looped or U-shaped member 105.

The pivot 104, it will be noted, is attached to the vessel in any suitable location whereby the depth charge 54 falls into the water at a position with respect to the vessel, such that the depth charge will descend within the water substantially in the vertical plane of the detected submarine. The switch SS is arranged to be set at will to different positions in accordance with the rate of travel of the vessel or, if desired, the setting of the switch SS may be controlled automatically by means suitable for the purpose such, for example, as by a governer controlled by the speed of the propulsion mechanism of the vessel, or by the ship's log. Relays A, B, and C are sensitive relays adapted to be controlled by the photoelectric cells 71, 68, and 69, respectively. Whereas in the illustrative embodiment of the invention shown on Fig. 16, the relays A, B, and C are connected directly to the photoelectric cells, it will, of course be understood that suitable signal amplifying means such as a vacuum tube amplifier may be employed, if desired, intermediate the photoelectric cells and the relays, without departing from the spirit and scope of the invention herein disclosed. The relay P, it will be noted, is a power relay adapted to control the relatively large current required for the positive operation of the depth charge release magnets.

As the vessel continues its movement past the hidden submarine, the recording element and mirror 65 continues to rotate until the point 106 on the curve 52 is reached, thereby activating the photoelectric cell 71 and causing the operation of relay A. As armature 107 of relay A moves into engagement with its make contact, battery on conductor 108 is applied to the winding of relay A, thereby preventing relay A from releasing as the recording element and mirror again move back to the null position. The operation of relay A at armature 109 thereof is without effect at this time, for the reason that armature 91 of relay B is in engagement with its make contact.

After the depth charge has been released, switch S is moved momentarily to open position, thereby releasing relays A, B, C, and P. The release of relay P at armature 98 thereof removes ground from conductor 101, thereby restoring the release magnet RM2 to an unoperated condition in which another depth charge may be suspended from the member 103.

In the event that the hidden submarine had been degaussed, the effect of the degaussing operation upon the submarine may have caused the field set up by the submarine to be of opposite polarity, in which case the mirror 65 would first be rotated in a direction to cause the photoelectric cell 71 to be activated, thereby applying battery by way of conductor 111 to the winding of relay A. Relay A operates and at its armature 109 and make contact thereof applies ground by way of conductor 92 to relay C. As the recording element moves into the null position, light rays from the electric bulb 74 are reflected by the mirror 65 onto the photoelectric cell 69, thereby operating relay C and causing the depth charge to be released. As the recording element continues its movement, relay B is operated by the activation of the photoelectric cell 68 and locks by way of its make contact and armature 89 thereof to battery.

While in the example assumed, the selected depth charge was released from an attacking vessel, it will be understood that, if desired, the depth charge may be released from an aircraft in flight, such, for example, as the aircraft illustrated on Fig. 3. Furthermore, the invention according to the illustrative embodiment thereof shown on Fig. 3 is not limited to the specific type of charge or explosive bomb illustrated thereon as it may be advantageously employed for releasing depth charges or bombs in which aerodynamic means are provided for directing the missile along the free flight thereof after release from the aircraft.

When employed with an aircraft, the system of Fig. 16, using but a single release magnet such, for example, as the release magnet RM2, is satisfactory for the purpose and, if desired, the selector switch SS may be omitted and the armature 98 of relay P connected directly to the winding of the release magnet RM2. Furthermore, while in the illustrative embodiment of the invention of Fig. 16, photoelectric cells are employed for controlling the operation of relays A, B, and C, it will be understood that other instrumentalities such, for example, as photronic cells may, if desired, be employed instead of the photoelectric cells illustrated, in which case no external source of electrical energy is required for the operation of the sensitive relays A, B, and C.

Briefly stated in summary, the present invention contemplates the provision of new and improved mechanism for detecting and locating a hidden submarine from a vessel under way, or an aircraft in flight, wherein the gradient magnetic field of the submarine is employed to control the detecting mechanism. Furthermore, the system of the present invention includes means for recording the signal received when a submarine is detected and means for automatically releasing a depth charge or explosive bomb selectively from the attacking craft, such that the explosive charge occurs substantially within the vertical plane of the submarine and in proximate relation thereto. When employed with an attacking vessel, the present invention provides means for detecting the presence of a hidden submarine in which the effects of roll and pitch of the vessel are greatly reduced.

While the invention has been described with reference to certain preferred examples thereof which give satisfactory results, it will be understood by those skilled in the art to which the invention pertains, after understanding the invention, that various changes and modifications may be made without departing from the spirit and scope of the invention, and it is my intention, therefore, to cover in the appended claims all such changes and modifications.

The invention herein described may be manufactured and used by or for the Government of the United States of America for governmental purposes without the payment of any royalties thereon or therefor.

What is claimed as new and desired to be secured by Letters Patent of the United States is:

1. In a system of the character disclosed for detecting and recording signals indicative of the presence of a submarine, a gradient device including a pair of opposedly connected non-rotating search coils adapted to generate said signals in response to variations in the intensity of the magnetic field within each of the coils, an electro-responsive device operatively connected to said coils and having an element adapted to be actuated to settings corresponding to the difference between the instant values of the flux through each of said coils, and means controlled by said element for recording said signals.

2. In a system of the character disclosed for recording the passage of a submarine from a vessel in motion, a pair of opposedly connected non-rotating coils disposed in predetermined space relation on different portions of said vessel, means for electrically balancing said coils, an electro-responsive device in electrical connection with said coils and adapted to be operated variably in accordance with the gradient of the magnetic field of a submarine detected by the coils, and means controlled by said electro-responsive device for recording the passage of a predetermined portion of said vessel over the magnetic center of the submarine.

3. In a system of the character disclosed for registering the passage of a submarine from a vessel in motion, a pair of opposedly connected non-rotating coils disposed in predetermined space relation on different portions of said vessel, means for electrically balancing said coils, an electro-responsive device in electrical connection with said coils adapted to be operated variably in accordance with the gradient of the magnetic field of a submarine disposed adjacent the path of travel of the vessel, and means controlled by said electro-responsive device for registering the instant of passage of a predetermined portion of said vessel over the magnetic center of the submarine.

4. In a system of the character disclosed for attacking a submarine from a vessel in motion, means including a pair of non-rotating coils arranged on the vessel in predetermined space relation and responsive to the magnetic field of the submarine for generating an electrical signal in accordance with the gradient of said magnetic field, signal receiving means adapted to take settings corresponding to the difference between the instant values of the flux through each of said coils, an explosive depth charge releasably supported by said vessel, and means controlled by said signal receiving means for releasing said depth charge directly above the submarine.

5. In a system of the character disclosed for attacking a submarine from a vessel in motion, means including a pair of non-rotating coils arranged on the vessel in predetermined space relation and responsive to the gradient of the magnetic field of the submarine for generating an electric signal as the vessel moves into a predetermined position above the submarine, and means including a voltage integrating device adapted to take settings corresponding to the difference in the instant values of the flux linkages of each of said coils and controlled by said signal for releasing an explosive depth charge as the vessel moves into said predetermined position.

6. In a system of the character disclosed for attacking a submarine from a vessel in motion, means including a pair of non-rotating search coils responsive to the gradient of the magnetic field of the submarine for generating an electric signal in accordance with the difference in the number of flux linkages of each of said coils as the vessel moves into a predetermined position above the submarine, and means including a fluxmeter adapted to take and hold settings corresponding to the difference in the instant values of the flux linkages of each of said coils and controlled by said signal for releasing an explosive depth charge as the vessel moves into said predetermined position.

7. In a system of the character disclosed for attacking a submarine, a pair of non-rotating search coils disposed in fixed space relation on different portions of an attacking vessel, means including an electro-responsive device having a movable element adapted to be set to different positions in accordance with the gradient of the magnetic field of the submarine detected by said search coils, a pair of control relays adapted to be operated selectively by said movable element as the vessel approaches the submarine, each of said control relays having means for closing a circuit as the relay operates, a slow releasing relay operatively connected to each of said circuit closing means, means controlled by said movable element and said circuit closing means for operating said slow releasing relay as the vessel passes over the detected submarine, and means controlled by said slow releasing relay for causing an explosive depth charge to be released from the attacking vessel above said submarine.

8. In a system of the character disclosed for attacking a submarine, a first non-rotating search coil arranged on an attacking vessel, a second non-rotating search coil arranged parallel to said first coil, means including an electro-responsive device having a movable element adapted to be set to different positions in accordance with the gradient of the magnetic field of the submarine detected by the search coils, a plurality of control relays adapted to be operated selectively by said movable element, each of said control relays having means for closing a circuit as the relay operates, a slow releasing relay operatively connected to each of said circuit closing means, means controlled by said movable element and said circuit closing means for operating said slow releasing relay as the vessel passes over the detected submarine, and means controlled by said slow releasing relay for causing an explosive depth charge to be released above said submarine.

9. In a system of the character disclosed for attacking a submarine from a moving vessel, means including a pair of electrically balanced and opposedly connected non-rotating coil devices arranged on the vessel in predetermined space relation for sensing a disturbance of the earth's magnetic field caused by a submarine disposed within the path of travel of the vessel, an electro-responsive flux recording device operatively connected to said coil devices and having a movable element adapted to be moved to different settings selectively in accordance with the gradient of the magnetic field of the submarine sensed by said coil devices and to hold each of said settings until moved therefrom by a change in the difference between the instant values of the flux through each of said coils, and means controlled by said electro-responsive device for releasing an explosive depth charge when said movable element has been moved to a predetermined position in response to said gradient of the magnetic field of the submarine sensed by said coil devices.

10. In a system of the character disclosed for attacking a submarine from an aircraft in flight, a pair of non-rotating opposedly connected search coils arranged in predetermined space relation on said aircraft and adapted to generate variable signal indications of opposite polarity in accordance with variations in the intensity of the earth's magnetic field within each of the coils, an explosive depth charge releasably supported by said aircraft, and means including a voltage integrating device operatively connected to said coils and responsive to the gradient of the magnetic field of the submarine detected by the coils for releasing the depth charge as the polarity of said signal indications is reversed during the passage of the aircraft over the submarine.

11. In a system for attacking a hidden submarine from a vessel while in motion, a pair of non-rotating coils arranged in predetermined space relation on said vessel and adapted to generate signals in accordance with the difference in the flux linkages of the coils with a magnetic field, an electro-responsive device controlled by said signals and having a movable element settable to different positions including an initial position and a predetermined position, a first relay adapted to be operated as the movable element is moved into said predetermined position, a second relay controlled by said first relay and adapted to be operated as the movable element is moved from said predetermined position to said initial position, an explosive depth charge releasably supported by said vessel, and means responsive to the operation of said second relay for releasing the depth charge as the vessel passes over the magnetic center of the submarine.

12. In a mechanism for recording the gradient of the magnetic field of a submarine, the combination of a vessel having a pair of opposedly connected non-rotating coils arranged in space relation thereon, a pair of variable resistance elements adapted to effect a balance between said coils, and means including a voltage integrating device in operative connection with each of said resistance elements for recording the gradient of the magnetic field of a submarine detected by said coils.

13. A mechanism for recording the gradient of the magnetic field of a submarine comprising a pair of opposedly connected non-rotating coils arranged in space relation on a vessel, a plurality of resistance elements connected to each of said coils respectively and having means settable at will for equalizing the signals generated by the coils as the vessel moves through a uniform magnetic field, and means including a voltage integrating device in electrical connection with said signal equalizing means and responsive to the signals generated by said coils as the vessel moves through the magnetic field of a submarine for recording the gradient of said magnetic field.

14. A system of the character disclosed for automatically releasing an explosive depth charge above a submarine from an attacking vessel comprising a pair of non-rotating search coils arranged in space relation on said vessel, a plurality of resistance elements connected to each of said coils respectively and having means settable at will for equalizing the signals generated by the coils as the vessel moves through a uniform magnetic field, an electro-responsive device in electrical connection with said signal equalizing means and having an element adapted to be actuated to a plurality of different settings in accordance with the signals received from said coils as the gradient of the magnetic field of a submarine is traversed by the vessel, an explosive depth charge releasably secured to said vessel, and means controlled by said electro-responsive device for releasing the depth charge when said element has been actuated successively in a predetermined sequential order to said plurality of different settings.

15. In a system of the character disclosed for automatically releasing an explosive depth charge above a submarine from a moving vessel comprising a pair of non-rotating search coils arranged in space relation on said vessel and adapted to generate signals in accordance with the difference in the intensity of a magnetic field within the coils, an electro-responsive device operatively connected to said coils and actuatable in accordance with the gradient of the magnetic field of a submarine traversed by the moving vessel, means controlled by said electro-responsive device for closing a release circuit when the search coils are in a predetermined position with respect to said submarine, a plurality of release devices disposed at different portions of said vessel, a plurality of explosive depth charges in releasable engagement respectively with said release devices, and means settable at will for causing a predetermined depth charge to be released by a selected release device in response to the closure of said release circuit.

16. In a system of the character disclosed for recording the gradient of the magnetic field of a submerged submarine and releasing a depth charge thereabove from a vessel while in motion, a plurality of explosive depth charges releasably secured to said vessel, means settable at will for selecting one of said plurality of depth charges for release, submarine detecting means including a device for recording the gradient of the magnetic field of a submarine and a pair of non-rotating coils for detecting said gradient, and means controlled by said submarine detecting means for releasing the selected depth charge concurrently with the recording of the gradient of said magnetic field by said recording device as the vessel passes over the submarine.

17. In a system of the character disclosed for releasing a depth charge above a hidden submarine disposed adjacent the path of travel of a vessel, means including a pair of non-rotating search coils arranged on said vessel in predetermined space relation and adapted to detect a disturbance in a uniform magnetic field caused by said submarine, a plurality of photoelectric devices selectively controlled by said detecting means in accordance with the difference in the intensity of the magnetic field within the coils, means including a plurality of relays in operative connection with said photoelectric devices for closing a release circuit when the search coils are in a predetermined position with respect to said submarine, a plurality of release devices adapted to be selectively operated by said release circuit, a plurality of explosive depth charges in releasable engagement respectively with said release devices, means for selecting a particular release device for operation, and means effective as said release circuit is closed for causing a particular depth charge to be released by the selected release device.

18. In a system of the character disclosed for selectively degaussing a vessel and recording the gradient of the magnetic field of a hidden submarine from the vessel, a pair of non-rotating coils arranged on opposite end portions of the vessel adapted to degauss the vessel or selectively to detect a submarine moving with respect thereto, a pair of switching devices respectively connected to said coils and settable at will to a degaussing position and to a detecting position, a source of electrical energy adapted to be connected to the coils by said switching devices when the switching devices are set in said degaussing position, a pair of variable resistors adapted to be connected respectively in parallel with said coils by said switching devices in lieu of said source of electrical energy when the switching devices are moved to said detecting position, an electrical connection between said resistors whereby the coils are opposedly connected when the resistors are connected to the coils by said switching devices, and an electro-responsive device operatively connected to said variable resistors for recording the gradient of the magnetic field of a submarine, said electro-responsive device having a movable recording element adapted to be actuated in either direction from a null position to a moved position selectively in accordance with the gradient of the magnetic field of the submarine detected by said coils.

19. In a system of the character disclosed for recording the gradient of the magnetic field of a submarine from a moving vessel, a pair of non-rotating coil devices arranged on the vessel in predetermined space relation for sensing the magnetic field of a submarine, means for electrically balancing said coil devices, a recording fluxmeter operatively connected to said balancing means, said fluxmeter having a movable recording element adapted to be set in different positions selectively in accordance with the difference in the number of flux linkages of each of said coil devices, and a movable chart upon which the gradient of the magnetic field of the submarine sensed by said coil devices is adapted to be recorded by said recording element.

20. In a system of the character disclosed for attacking a submarine from a moving vessel, a pair of non-rotating coils arranged on the vessel in predetermined space relation for sensing the magnetic field disturbance due to a submarine disposed near the path of the vessel, an electro-responsive device operatively connected to said coils, said electro-responsive device comprising a movable element having a null position and being positionable by said electro-responsive device away from said null position in either direction in accordance with the difference between the magnetic fields threading said coils, and means controlled by said electro-responsive device for releasing an explosive depth charge when said movable element has been moved away from and thereafter back to said null position in response to changes in said magnetic fields threading said coils.

ELLIS A. JOHNSON.

REFERENCES CITED

The following references are of record in the file of this patent:

UNITED STATES PATENTS

| Number | Name | Date |
|---|---|---|
| 1,353,652 | Hampton | Sept. 21, 1920 |
| 1,548,024 | Cuntz | Aug. 4, 1925 |
| 1,558,826 | Beebe | Oct. 27, 1925 |
| 1,589,398 | Kelley | June 22, 1926 |
| 1,686,884 | Trenor | Oct. 9, 1928 |
| 1,696,230 | Gilbert | Dec. 25, 1928 |
| 1,812,392 | Zuschlag | June 30, 1931 |
| 2,292,821 | Caulkins | Aug. 11, 1942 |

FOREIGN PATENTS

| Number | Country | Date |
|---|---|---|
| 130,350 | Great Britain | 1918 or 1919 |
| 130,050 | Great Britain | July 31, 1919 |
| 764,537 | France | Mar. 5, 1934 |